Jan. 7, 1941.   L. TENGEL   2,227,868
LINE GUIDE FOR FISHING RODS
Filed Aug. 10, 1938
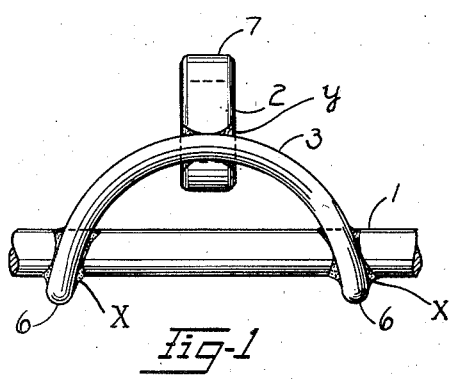
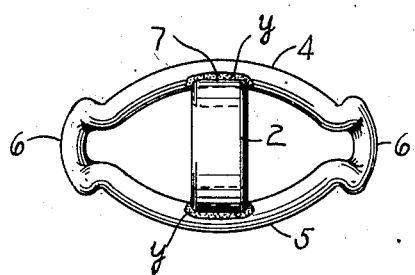
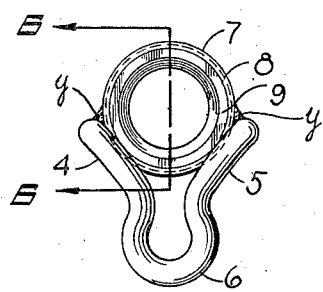
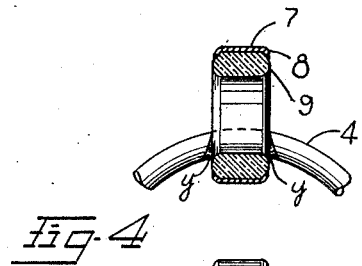
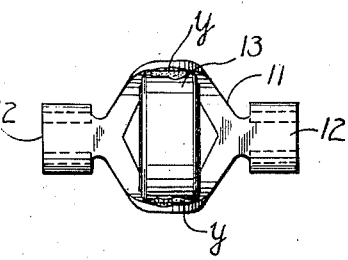
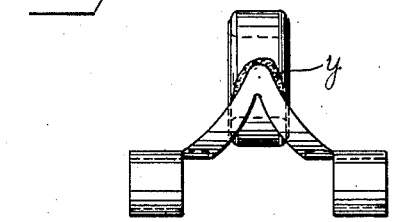
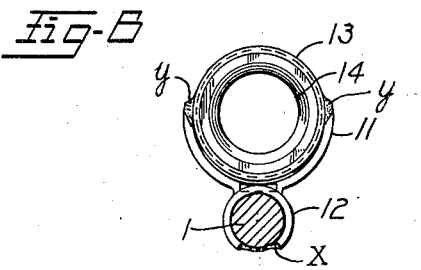
INVENTOR.
LOUIS TENGEL
BY
His ATTORNEY.

Patented Jan. 7, 1941

2,227,868

UNITED STATES PATENT OFFICE 2,227,868

LINE GUIDE FOR FISHING RODS

Louis Tengel, Geneva, Ohio, assignor to The American Fork & Hoe Company, Cleveland, Ohio, a corporation of Ohio Application August 10, 1938, Serial No. 224,072

7 Claims. (Cl. 43—24)

My invention relates to line guides for fishing rods and relates more particularly to line guides of the type adapted for use in connection with metallic fishing rods.

An object of my invention is to provide an improved connection between line guides and the metallic fishing rods to which they are affixed so as to securely unite the guide to the rod in a highly efficient, inexpensive and durable manner.

Another object of my invention is to provide an improved mounting for line guides of such type.

Other objects of my invention and the invention itself will become apparent from the following description in which description reference will be had to the accompanying drawing, in which:

Fig. 1 is a side plan view of a fishing rod and a preferred form of line guide mounted thereon;

Fig. 2 is a top plan view of the line guide of Fig. 1 prior to its mounting on the rod as shown in Fig. 1;

Fig. 3 is an end elevational view of the line guide of Figs. 1 and 2;

Fig. 4 is a side elevational sectional view of the annuli of Fig. 1;

Fig. 5 is a top plan view similar to that of Fig. 2 but showing a different embodiment of my invention;

Fig. 6 is a side plan view of the embodiment of Fig. 5; and

Fig. 7 is an end elevational view of the embodiment of Fig. 5.

Referring now to the figures of drawing in all of which like parts are designated by like reference characters, in Fig. 1, a metallic fishing rod is shown at 1 having a line guide, indicated generally at 2, affixed thereto. Said line guide 2 comprises a wire saddle member 3 having a pair of yoke portions 4 and 5 of generally arched form, as illustrated in Fig. 2, and downwardly bent end or hook portions 6—6 which are extensions of the yoke portions 4 and 5. Said portions 6—6 are adapted to be telescoped over the rod 1 and secured thereto as by soldering or brazing, as indicated at $x$ and are generally U-shape and of slightly greater diameter than the rod which they encompass.

The saddle yoke portions 4 and 5 are further soldered or brazed at their central portions, as indicated at $y$, to a metallic annulus 7 securely holding within its inturned flanges 8 an agate, stone or other non-frictional eye 9. Both of these annuli are shown in Figs. 3 and 4. The line guide of my invention is therefore preferably of unitary construction and, as shown, rigidly secured as by soldering, brazing or the like to the annulus 8 and the rod 1.

From the above it is noted that the embodiment of Figs. 1 to 4 inclusive comprises a circuitous wire 6—3—6 bent at opposite side portions 6—6 to provide fishing rod embracing loops 6—6 which are individually affixed to longitudinally spaced portions of the rod 1 and that by value of the bending of the wire 3 at 6—6 angularly divergent loops 4 and 5 are provided. The annular guide 2 is seated upon the intermediate portions of said loops and affixed thereto by brazing, soldering or the like as indicated at $y$ so that the guide is laterally spaced from the rod 1 with its axis parallel to that of the rod 1 in a very convenient manner and provides a truss structure bridging longitudinally spaced portions of the rod which is exceedingly strong and very resistant to bending whereby the guide is not susceptible to displacement in its spaced relation to the rod or its position of axial parallelism with the rod.

In Figures 5, 6 and 7 a variant form is described but wherein the same advantages are substantially achieved by analogous structure, this form of the invention being now specifically described. In the form shown in Figs. 5 to 7 inclusive, a similar line guide member is shown although the saddle 11 in these figures is formed of flat metal and generally V-shaped and not arched as the wire saddle 3. Further, the saddle 11 is provided with flat metal clip or clamp members 12—12 open at their lower ends and adapted to be clamped over the rod 1 and then soldered or brazed thereto, as shown in Fig. 7 at X. The saddle is also soldered or brazed, as indicated at Y, Fig. 6, to the metallic annulus 13 which retains the agate or stone eye 14 therein through which the line passes.

In the several embodiments shown herein it is to be noted that a unitary line guide and rod embracing unit is provided which is adapted to be soldered or brazed to the rod at its spaced ends and at a median point similarly secured to line receiving annuli.

I am familiar with guides of the prior art wherein flanged saddle ends are provided extending in substantial longitudinal alignment with a metallic rod and said ends are wire wound thereon. This type of mounting is not only more expensive to manufacture because of the increased labor involved therein but further does not have the strength and stability of the mounting shown herein in use. The disposition of a pair of spaced ends firmly secured as by soldering or brazing to the rod counteracts a "twisting" action which is imparted to the line guide means when the rod is in use and counterbalances the force or pull on each end thereof. The pull of the line and the bend of the rod are contributing factors to the unwinding or breaking of the winding in prior art devices. These factors are compensated in the present rigid mounting which, in effect, so unites the line guide means and the rod that they co-act as a unit.

While I have described my invention particularly in connection with the embodments illustrated herein, I am aware that numerous and extensive departures may be made therefrom but without departing from the spirit of my invention.

I claim:

1. A line guide for a fishing rod comprising an annular line guiding eye element disposed at an upper side of the rod with the rod held in a given horizontal and rotative position, and a rod and eye connector, said connector being of endless circuitous form and comprising a pair of end portions each of generally loop form adapted to embrace the side portions of the rod and each rigidly secured to the rod at relatively longitudinally spaced portions of said rod both adjacent to and longitudinally at opposite sides of said eye, the portions of said connector which are disposed intermediately of and joining said rod embracing end portions both extending from the embraced rod upwardly and diverging laterally outwardly therefrom, said eye rigidly secured to relatively laterally spaced medial portions of said diverging connector portions to support said eye at two opposite lateral sides thereof, and in proper line guiding position at the upper side of said rod.

2. A line guide for a fishing rod comprising an annular line guiding eye element disposed at an upper side of the rod with the rod held in a given horizontal and rotative position, and a rod and eye connector, said connector being of endless circuitous form and comprising a pair of end portions each of generally loop form adapted to embrace the underside and adjacent side portions of the rod and each rigidly secured to the rod at relatively longitudinally spaced portions of said rod both adjacent to and longitudinally at opposite sides of said eye, the portions of said connector which are disposed intermediately of and joining said rod embracing end portions both extending from the embraced rod upwardly and diverging laterally outwardly therefrom, said eye rigidly secured to relatively laterally spaced medial portions of said diverging connector portions to support said eye at two opposite lateral sides thereof, and in proper line guiding position at the upper side of said rod.

3. A line guide for a fishing rod comprising an annular line guide disposed with its axis substantially parallel to the rod axis and at an upper side thereof when the rod is held horizontally, and a support for interconnecting the rod and guide, said support being in the form of a circuitous loop, opposite end portions thereof substantially embracing the rod at either longitudinal side of the guide, the intermediate portions and the support extending upwardly along the sides of said rod and upwardly beyond said rod and laterally divergingly therefrom, said support being rigidly secured to said rod by said rod embracing portions, and to said guide to maintain said guide in proper line guiding relation to the rod at the upper side of said rod, said guide disposed between and affixed to said support intermediate portions.

4. In combination with a fishing rod, of a substantially annular line guide therefor, and a support for said guide, said support supporting said guide on the rod in laterally spaced relation to the rod and with its axis disposed parallel to the rod axis, said guide comprising an endless circuitous wire bent at opposite side portions to provide angularly diverging loops, said opposite bent side portions being adapted to individually embrace relatively longitudinally spaced portions of the rod, said guide being supported at two relatively spaced portions of its periphery by portions of said loops which are most remote from said rod embracing portions of said wire.

5. In combination with a fishing rod, a substantially annular line guide therefor, and a circuitous element forming a continuous loop, said element having its longitudinally extending portions relatively spaced and generally arched and its oppositely disposed end portions generally loop-shaped and closely embracing and rigidly secured to said rod, the intermediate portions of said loop being rigidly secured, to opposite lateral portions of the periphery of said guide whereby said guide is held laterally of and in parallel relation to said rod.

6. A line guide support for interconnecting a line guide with a fishing rod at an upper side thereof, comprising an endless circuitous element bent medially substantially along a diametrical line thereof to form a V with the wings of the V in the form of an arcuate loop, the inner apex surface of the V affixed to and under an adjacent lateral rod surface and the V wings affixed to the sides of said guide to maintain said guide in proper line guiding relationship to said rod at the upper side thereof.

7. A line guide for a fishing rod comprising an annular line guiding eye element disposed at an upper side of the rod with the rod held in a given horizontal and rotative position, and a rod and eye connector, said connector comprising a pair of end portions each of generally loop form adapted to embrace the side portions of the rod and each rigidly secured to the rod at relatively longitudinally spaced portions of said rod both adjacent to and longitudinally at opposite sides of said eye, the portions of said connector which are disposed intermediately of and joining said rod embracing end portions both extending from the embraced rod upwardly and diverging laterally outwardly therefrom, said eye rigidly secured to relatively laterally spaced medial portions of said diverging connector portions to support said eye at two opposite lateral sides thereof, and in proper line guiding position at the upper side of said rod.

LOUIS TENGEL.